United States Patent Office 2,920,059
Patented Jan. 5, 1960

2,920,059

STABILIZATION OF POLYOXYMETHYLENES WITH AROMATIC AMINES

Robert Neal MacDonald and Milton John Roedel, Wilmington, Del., assignors to E. I. du Pont de Nemours and Company, Wilmington, Del., a corporation of Delaware No Drawing. Application April 8, 1957
Serial No. 651,188

7 Claims. (Cl. 260—45.9)

This invention relates to high molecular weight polyoxymethylenes, and, more specifically, it relates to such polyoxymethylenes having improved thermal stabilities.

This is a continuation-in-part of copending patent application Serial No. 327,692 filed by R. N. MacDonald and M. J. Roedel on December 23, 1952, now abandoned.

U.S. Patent 2,768,994, issued to R. N. MacDonald on October 30, 1956, describes normally solid, synthetic, high molecular weight polyoxymethylenes which have a degree of toughness of at least 1, or which have a reaction rate constant for thermal degradation at 222° C. of less than 1% by weight per minute. The degree of toughness is measured by the consecutive steps of compression-molding the polyoxymethylene into a film 3–7 mils in thickness, heating the film in air at 105° C. for seven days, cooling the film to room temperature, and, while at room temperature, manually folding and creasing the film along a line followed by manually folding and creasing the film in the reverse direction along the same line without a break occurring in the film along that line. The numerical value of the degree of toughness is 1 if no break occurs after the single cycle of folding and creasing in two directions as described above, the value is 2 if the folding and creasing can be continued through 2 such cycles, and higher values of the degree of toughness are obtained by continuing through a higher number of cycles. In copending applications, U.S. Serial Numbers 365,234, Patent No. 2,841,570; 365,235, Patent No. 2,828,286; and 365,278, Patent No. 2,844,561, all filed June 30, 1953, there are disclosed methods of preparing novel polyoxymethylenes which can be formed into tough, flexible films that retain their toughness and flexibility over long periods of time. The prior art teaches that polyoxymethylenes of moderately high molecular weight can be made which initially possess desirable properties. These known polymers can be formed into films or other articles that are tough and flexible but the polymer degrades quickly when heated at an elevated temperature, e.g., 105° C., as evidenced by the generation of formaldehyde fumes and embrittlement of films prepared therefrom.

It is an object of the present invention to provide as a new composition of matter a polyoxymethylene having a degree of toughness of at least 1 or a reaction rate constant for thermal degradation at 222° C. of less than 1% by weight per minute, and having an improved thermal stability by reason of the presence of certain secondary or tertiary aromatic amines as stabilizers. It is another object of this invention to provide thermal stabilizers which can be incorporated into a polyoxymethylene, and thereby produce polyoxymethylene composition which is more stable to thermal treatment than the original polyoxymethylene. It is another object of this invention to provide methods of incorporating aromatic amines into preformed polyoxymethylenes to produce polymers having improved toughness, flexibility, and thermal stability. The above objects are accomplished by intimately associating a secondary or tertiary aromatic amine with a normally solid, synthetic, high molecular weight polyoxymethylene having a degree of toughness of at least 1 or having a reaction rate constant for thermal degradation at 222° C. of less than 1% by weight per minute. Preferably, the polyoxymethylene is one which has a degree of toughness of at least 1, and also exhibits a reaction rate constant for thermal degradation at 222° C. of less than 1% by weight per minute.

One of the starting materials for this invention is a normally solid, synthetic, high molecular weight polyoxymethylene described and claimed in U.S. Patent 2,768,994 issued October 30, 1956, to R. N. MacDonald. That polyoxymethylene is described as (1) one which has a degree of toughness of at least 1 determined by the consecutive steps of compression-molding the polyoxymethylene into a film 3 to 7 mils in thickness, heating the film in air at 105° C. for 7 days, cooling the film to room temperature, and while at room temperature, manually folding and creasing the film along a line, and manually folding and creasing the film in the reverse direction along the same line without a break occurring along that line, or (2) one which does not have a degree of toughness of at least 1, but which does have a reaction rate constant for thermal degradation at 222° C. of less than 1% by weight per minute measured by thermally degrading the polyoxymethylene in a vessel open to the atmosphere. These polyoxymethylenes have a thermal stability which is better than any polyoxymethylene known in the prior art.

The thermal stabilizing compound employed in this invention has been found to produce an even greater degree of thermal stability in the polyoxymethylenes described above. The thermal stabilizer of this invention is a secondary or a tertiary aromatic amine.

A convenient way for preparing the new compositions of this invention is to dissolve the aromatic amine in a volatile solvent, add an amount of solution to the polyoxymethylene sufficient to provide from 0.001% to 10%, and, preferably, 0.1% to 5%, by weight of the aromatic amine stabilizer based on the polymer, and then stir the mixture. The solvent is thereafter removed by evaporation. Alternatively, the aromatic amine stabilizer can be incorporated into molten polyoxymethylene by milling or by other known procedures.

It is believed that the chain of a polyoxymethylene, which is composed of recurring —CH$_2$O-units, is subject to degradative attack by three separate mechanisms. Firstly, the hydrogen atoms are subject to an oxidative attack by oxygen or by free radicals having an oxidative tendency. Secondly, the oxygen of the polymer chain is subject to hydrolytic attack by hydrogen ion or its equivalent. Experimental evidence indicates that both the oxidative attack and the hydrolytic attack cause chain cleavage of the polymer. The third attack is one which is believed to start at the end of a polymer chain to cause an unzippering effect, in that the end formaldehyde unit is broken away and then the next unit, and so on, until a strong unit is reached that will not break away. These three mechanisms may be inhibited by the presence of scavenger compounds for destroying free oxidative radicals and compounds causing hydrolytic attack, and by the formation of strong end groups on the polymer chain. It is believed that the secondary or tertiary aromatic amines employed in this invention find their principal use in scavenging the oxidative radicals from the polymer environment, although they may also help to stabilize the polymer in other ways.

The examples which follow are submitted to illustrate and not to limit this invention. Parts and percentages are by weight unless otherwise specified. Degree of toughness and reaction rate constant for thermal degradation at 222° C. are measured as described in U.S. Patent 2,768,994. Inherent viscosity is measured at 60° C. on a 0.5% solution of the polymer in p-chlorophenol containing 2% by weight of alphapinene.

EXAMPLE 1

A sample of a formaldehyde polymer, prepared as described below was treated with an acetone solution of di-beta-naphthyl-p-phenylenediamine in amount sufficient to provide 2% by weight of the amine, based on the polymer. After evaporation of the acetone and air-drying for several days, the treated sample and an untreated formaldehyde polymer control were compression-molded at 190° C. and 2000 lb./sq. in. to films of about 5 mils in thickness. The films thus prepared were heated in a circulating air oven at 105° C. and tested periodically for weight loss and toughness. The degree of toughness of the sample was determined by folding the film through 180°, creasing it, folding back through 360°, and creasing again. This cycle was repeated until the film had cracked. If cracking occurred in the first creasing cycle, it is said to have a degree of toughness of zero. If it stands one complete creasing cycle but breaks in the second, it is said to have a degree of toughness of one, and so forth. the results are summarized in the following table:

Table I

| Stabilizer | Percent Weight Loss | | Toughness [1] | |
|---|---|---|---|---|
| | 1 Week | 2 Weeks | 1 Week | 2 Weeks |
| None | 5.6 | 22.8 | Tough | Brittle |
| Di-beta-naphthyl-p-phenyl-enediamine | 5.3 | 7.7 | Tough | Tough |

[1] "Brittle" means that the film cracked in the first creasing. "Tough" means that there was no evidence of failure after 100 creasing cycles.

The formaldehyde polymer used in the above example was prepared as follows:

Three hundred fifty grams of anhydrous ether were placed in a 2-liter flask equipped with a mechanical stirrer and gas inlets and outlets. The flask was cooled in a Dry Ice/acetone bath and the solvent stirred rapidly as formaldehyde gas was passed into the solvent. The monomeric formaldehyde was obtained from the pyrolysis of alphapolyoxymethylene under 100 mm. pressure and was purified by passing it at this pressure through 12 U-shaped traps held at −40° C. The ether solution of formaldehyde obtained was separated from the film of polymer on the walls of the flask and traces of floating solid by gravity filtration. The clear filtrate was stirred rapidly under nitrogen at atmospheric pressure and held at −70° C. to −75° C. as 0.06 gram of n-butylamine (0.024 mole percent) in 28 grams of ether was added gradually over a 43-minute period from a burette. The white, granular formaldehyde polymer which formed was found to have an inherent viscosity of 2.3 at 0.5% concentration in p-chlorophenol containing 2% alpha-pinene at 60° C.

EXAMPLE 2

A three-gram portion of formaldehyde polymer, prepared similarly to the polymer of Example 1, was stirred in ether with 0.06 gram of triphenylamine. After evaporation of the ether, the treated sample and a control sample were heated for 1 hour at 135° C. under 1 mm. vacuum, and then heated for 30 minutes at 180° C. in nitrogen. The weight of each sample before and after this treatment was recorded. The sample with the triphenylamine lost 13.3% in weight as compared to 16.0% for the untreated control.

EXAMPLE 3

Table II is a summary of the weight losses suffered by compositions made by blending polyoxymethylene (inherent viscosity 1.75) prepared essentially as described in Example 5 in U.S. Patent 2,768,994 issued to R. N. MacDonald, on October 30, 1956, with the indicated stabilizers. These compositions were prepared by incorporating into 50 parts of the finely divided polymer 1 part of the stabilizer. The weight loss was determined by pressing an exactly weighed 0.5000 gram sample of the blend between aluminum foils for 5 minutes at 200° C. and 3000 pounds ram pressure. The film thus obtained was removed from the press, immediately cooled, and then carefully weighed. The weight loss was compared with that of a similarly prepared film containing no stabilizer. The polyoxymethylene, unmodified by any of the following stabilizers, had a degree of toughness of greater than 100.

Table II

| Stabilizer | Stability at 200° C./5 min./3,000 pounds | |
|---|---|---|
| | Percent Weight Loss of Stabilized Sample | Percent Weight Loss of Unstabilizer Sample |
| p-Hydroxyphenylmorpholine | 9.9 | 19.7 |
| Tetraphenyltetrazene | 9.1 | 19.7 |
| Di-sec.-butyl-p-phenylenediamine | 14.4 | 19.7 |
| N,N'-Dihenylbenzidine | 7.4 | 19.7 |
| Diphenylamine | 9.3 | 19.7 |
| N,N'-Diphenyl ethylenediamine | 10.8 | 19.7 |
| p,p'-Dioctyldiphenylamine | 12.6 | 19.7 |
| N,N'-Diphenyl-p-phenylenediamine | 7.4 | 19.7 |

EXAMPLE 4

Formaldehyde polymer was prepared essentially as described in Example 3 in the copending application of M. F. Bechtold and R. N. MacDonald, U.S. Serial Number 365,278, filed June 30, 1953, as follows:

The monomeric formaldehyde from the pyrolysis of 100 grams of alpha-polyoxymethylene was passed over a period of 4 hours through two traps at −15° C., then into a reactor in which a solution of 1.5 grams of lauryl methacrylate/beta-diethylaminoethyl methacrylate (80:20 copolymer) in 710 grams of n-pentane was continually agitated and maintained at 20° C. The 36 grams of snow-white granular formaldehyde polymer which formed had an inherent viscosity of 4.6 at a concentration of 0.5% in p-chlorophenol/2% alpha-pinene solution at 60° C., and pressed films of this polymer exhibited a degree of toughness in excess of 100. This polymer will be designated A. Two grams of A was stirred with a solution of 0.04 gram of diphenylamine in 10.5 grams of diethyl ether. The ether was evaporated by a stream of nitrogen and finally by heating at 77°–95° C. in a vacuum oven under 15 mm. absolute pressure. In a similar manner, 0.04 gram of N,N'-di-o-tolyl-p-phenylenediamine was incorporated into 2 grams of A. These three samples were then subjected to stability tests comprising heating at 225° C. for 30 minutes in air and heating in a Carver press at 200° C. for 5 minutes under 3000 pounds ram pressure and determining the weight loss in each case.

| Sample | Weight Loss | |
|---|---|---|
| | 225° C./30 min. | 200° C./5 min. 3,000 pounds |
| | Percent | Percent |
| A | 43.6 | 1.9 |
| A+Diphenylamine | 12.4 | 1.3 |
| A+N,N'-di-o-tolyl-p-phenylenediamine | 10.5 | 0.9 |

EXAMPLE 5

Formaldehyde polymer was prepared in essentially the same manner as described in Example 4 of this application. Two percent of N,N'-bis(4-anilinophenyl)-para-phenylenediamine was added as a stabilizer to one sample of the formaldehyde polymer, while another sample of the polymer was not treated. Both samples were subjected to a weight loss test by heating in a Carver press at 200° C. for 5 minutes under 3000 pounds ram pressure. The untreated sample lost 3.6% of its weight on this test, while the sample treated with N,N'-bis(4-anilinophenyl)-para-phenylenediamine lost only 0.2% of its weight in the same test.

EXAMPLE 6

Formaldehyde gas from the pyrolysis of 75 grams of alpha-polyoxymethylene was passed through 2 traps at −15° C., then into a reactor containing a solution of 0.1 gram of diphenylamine and 1 gram of a 50% kerosene solution of an 80:20 copolymer of lauryl methacrylate/beta-diethylaminoethyl methacrylate in 630 grams of n-pentane. The reaction medium was rapidly agitated while being maintained at 25° C. with a water bath. Polymer precipitated in white, granular form throughout the 2.9 hours of pyrolysis. Upon filtering the thick slurry, followed by extraction of the product with diethyl ether and air- and vacuum-drying, there was obtained 31 grams of snow-white formaldehyde polymer having an inherent viscosity of 2.4, measured at 60° C. as a 0.5% solution in p-chlorophenol containing 2% alpha-pinene, and this polymer exhibited a degree of toughness in excess of 100. This polymer was heated in the melt at 225° C. for 30 minutes, during which time it lost only 6.5% of its weight compared to a 43.6% weight loss for a formaldehyde polymer prepared identically except for the omission of the diphenylamine.

EXAMPLE 7

Monomeric formaldehyde, obtained by the pyrolysis of alpha-polyoxymethylene, was passed through a series of U-tube traps, maintained at about −15° C., and thence into the liquid reaction medium. The reaction medium comprised about 800 ml. of a commercial octane fraction, boiling at 212° F. to 284° F., in which were dissolved 1 gram of an 80:20 copolymer of lauryl methacrylate/beta-diethylaminoethyl methacrylate and 0.2 gram of di-beta-naphthyl para-phenylenediamine. The reaction medium was rapidly agitated for 1 hour at a temperature varying from 25° C. to 48° C. The polymer which formed was a white, granular formaldehyde polymer in the amount of 32 grams. When this polymer was subjected to a weight loss test by heating at 225° C. for 1 hour, the sample lost 29.0% of its weight. A sample of polymer prepared identically as described above, except that di-beta-naphthyl para-phenylenediamine was omitted as an ingredient, was subjected to the same 225° C./1 hour test and suffered a weight loss of 43.5%.

EXAMPLE 8

A polyoxymethylene was prepared by a procedure similar to that of Example 6 except that the reaction medium was cyclohexane and the reaction temperature was 15°–20° C. The resulting polyoxymethylene was treated with a mixture of acetic anhydride and pyridine as described in copending application Serial No. 443,702, filed by S. Dal Nogare and J. O. Punderson on July 15, 1954. The product resulting from this treatment was a polyoxymethylene having each of its terminal valences satisfied by an acetate group. This acetylated product exhibited a reaction rate constant for thermal degradation at 222° C. of 0.29% by weight per minute. Portions of this acetylated polymer were treated with 2% by weight of the following stabilizers, and then tested for the reaction rate constant for thermal degradation at 222° C. ($k_{222}$), the results being shown in Table III.

Table III

| Stabilizer | $k_{222}$, Percent by Weight per Minute |
| --- | --- |
| None—Control | 0.29 |
| Diphenylbenzidine | 0.15 |
| Di-beta-naphthylbenzidine | 0.18 |
| Di-beta-naphthyl-p-phenylenediamine | 0.17 |

Other portions of the above-described acetylated polyoxymethylene in the form of a dry, fluffy powder, in the amount of 1 gram, were dry-mixed with 0.02 gram of a stabilizer listed in Table IV, and the resulting mixture was placed in a shallow dish and heated for 20 minutes in a circulating air oven at 225° C. The weights of each sample before and after this treatment were translated into a percentage weight loss as reported in Table IV.

Table IV

| Stabilizer | Percent Weight Loss |
| --- | --- |
| None—Control | 80 |
| Di-beta-naphthyl-p-phenylenediamine | 4 |
| Diphenylbenzidine | 4 |
| Commercial product of acetone and diphenylamine | 4 |
| Mixture of 35% diphenyl-p-phenylenediamine and 65% phenylnaphthylamine | 5 |

Still other portions of the same acetylated polyoxymethylene were mixed with different proportions of di-beta-naphthyl-p-phenylenediamine and subjected to the above-described test relating to a treatment at 225° C. for 20 minutes in a circulating air oven. The results are shown in Table V.

Table V

| Weight Percent of Di-beta-naphthyl-p-phenylenediamine | Percent Weight Loss |
| --- | --- |
| None—Control | 80 |
| 0.005% | 45 |
| 0.01% | 23 |
| 0.05% | 4 |
| 0.1% | 4 |
| 2.0% | 4 |

Examples of secondary and tertiary aromatic amines used in preparing the products of this invention are phenyl-alpha-naphthylamine, phenyl-beta-naphthylamine, di-beta-naphthylphenylenediamine, triphenylamine, N-methylaniline, N-butylaniline, diphenylamine, N-phenyl-alpha-naphthylamine, N-dodecyl-m-toluidine, N,N'-diphenylbenzidine, N-phenylbenzylamine, N-dimethylaniline, N-cyclohexyl-beta-naphthylamine, N-phenyl-N-methylaniline, N-dioctylaniline, di-para-tolyl-para,para'-phenylenediamine, di-meta-tolyl-meta,meta'-phenylenediamine, di-pyridylphenylenediamine, di-xylylphenylenediamines, di-morphilinophenylenediamines, di-N-morphilinobenzenes, diphenylxylylenediamines, di-cumenylphenylenediamines, ditolyldurylenediamines, phenothiazine, and the like.

The aromatic amine may be incorporated into the polymer in any manner well known to those skilled in the art. A convenient way is to dissolve the aromatic amine in a volatile organic solvent, preferably one which is also at least a partial solvent for the polyoxymethylene, and to steep the polymer in this solution. Thereafter the solvent may be removed by evaporation, desirably under reduced pressure. As an alternative, the aromatic amine, as such, may be added to the polymer and the blend homogenized by milling, plasticating, or other mixing at a temperature above the melting point of the polymer. In still another alternative, the blend may be made by dissolving the aromatic amine in a solvent for the polymer and adding the solution to a solution of the polymer in the same solvent. In yet another alternative, the aromatic amine may be added to the polymerization system either before or after the polymer has formed, but before isolation of the polymer.

The stabilized compositions of this invention are useful for conversion to films, sheets, fibers, filaments, bristles, molded articles, and the like, by melt-extrusion, injection-molding, compression-molding, and other fabrication methods known to the art.

We claim:

1. The thermally stabilized polyoxymethylene composition which comprises a normally solid, synthetic, high mocelcular weight polyoxymethylene selected from the group consisting of (1) polyoxymethylenes having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and (2) polyoxymethylenes failing to exhibit a degree of toughness of at least 1, but having a reaction rate constant for thermal degradation at 222° C. of less than 1% by weight per minute, measured by thermally degrading said polyoxymethylene in a vessel open to the atmosphere; and 0.001%–10% by weight of said polyoxymethylene of a thermal stabilizing compound from the group consisting of monomeric secondary aromatic amines and monomeric tertiary aromatic amines; said thermally stabilized polyoxymethylene composition being characterized in that said composition exhibits a greater degree of thermal stability than does said polyoxymethylene in the absence of said thermal stabilizing compound.

2. The thermally stabilized polyoxymethylene composition which comprises a normally solid, synthetic, high molecular weight polyoxymethylene having a degree of toughness of at least 1, said degree of toughness of at least 1 being determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and 0.001%–10% by weight of said polyoxymethylene of a thermal stabilizing compound from the group consisting of monomeric secondary aromatic amines and monomeric tertiary aromatic amines; said thermally stabilized polyoxymethylene composition being characterized in that said composition exhibits a greater degree of thermal stability than does said polyoxymethylene in the absence of said thermal stabilizing compound.

3. The thermally stabilized polyoxymethylene composition which comprises a normally solid, synthetic, high molecular weight polyoxymethylene having a reaction rate constant for thermal degradation at 222° C. of less than 1% by weight per minute, measured by thermally degrading said polyoxymethylene in a vessel open to the atmosphere, and 0.001%–10% by weight of said polyoxymethylene of a thermal stabilizing compound from the group consisting of monomeric secondary aromatic amines and monomeric tertiary aromatic amines; said thermally stabilized polyoxymethylene composition being characterized in that said composition exhibits a greater degree of thermal stability than does said polyoxymethylene in the absence of said thermal stabilizing compound.

4. The composition of claim 3 in which said reaction rate constant is less than 0.5% by weight.

5. The thermally stabilized polyoxymethylene composition which comprises a normally solid, synthetic, high molecular weight polyoxymethylene having a degree of toughness of at least 1 determined by the consecutive steps of compression-molding said polyoxymethylene into a film 3 to 7 mils in thickness, heating said film in air at 105° C. for 7 days, cooling said film to room temperature, and, while maintaining said film at room temperature, manually folding and creasing said film along a line, and manually folding and creasing said film in the reverse direction along the same line without a break occurring in the film along said line, and said polyoxymethylene also exhibiting a reaction rate constant for termal degradation at 222° C. of less than 1% by weight per minute measured by thermally degrading said polyoxymethylene in a vessel open to the atmosphere, and 0.1%–5% by weight of a thermal stabilizing compound from the group consisting of monomeric secondary aromatic amines and monomeric tertiary aromatic amines; said thermally stabilized polyoxymethylene composition being characterized in that said composition exhibits a greater degree of thermal stability than does said polyoxymethylene in the absence of said thermal stabilizing compound.

6. A film comprising the thermally stabilized composition of claim 1.

7. A fiber comprising the thermally stabilized composition of claim 1.

References Cited in the file of this patent

UNITED STATES PATENTS

| | | |
|---|---|---|
| 2,481,278 | Ballard et al. | Sept. 6, 1929 |
| 2,706,189 | Pruitt et al. | Apr. 12, 1955 |
| 2,768,994 | MacDonald | Oct. 30, 1956 |